Nov. 30, 1965  P. J. HUNCKLER  3,220,788
PARTS STORAGE AND MERCHANDISING DEVICE
Filed March 1, 1962

*INVENTOR.*
PAUL J. HUNCKLER
BY
*Lockwood, Woodard, Smith & Weikart*
Attorneys

United States Patent Office 3,220,788
Patented Nov. 30, 1965

3,220,788
PARTS STORAGE AND MERCHANDISING DEVICE
Paul J. Hunckler, 820 N. Jefferson St., Huntington, Ind.
Filed Mar. 1, 1962, Ser. No. 176,585
2 Claims. (Cl. 312—234.1)

This invention relates generally to cabinets and more particularly to a novel storage cabinet particularly well suited to the storage and merchandising of small parts.

Small parts such as bolts, nuts, screws and washers, for example, can be purchased from hardware stores, automobile parts stores, grocery stores, and some drug stores. However, in many instances, such parts are stocked only as a matter of convenience for the customers and are not profitable items of the inventory. In fact, it is known that in the automotive parts business, some jobbers will not even handle such small parts. However, most jobbers will handle them, though reluctantly.

In addition to establishments which stock small parts for resale, other establishments must stock small parts for their own use in their business. An example is a gasoline service station. However, it is not uncommon for the entire inventory of small parts of a gasoline service station to be stocked in a large coffee can. Thus the mechanic who is looking for a certain bolt, washer, cotter pin, or other small part must empty the entire contents of the can on a cloth or bench and sort through the varieties of mixed and usually dirty parts to find the needed part, without first knowing whether the part is actually there or not. The waste of time and frustration resulting from such practices can readily be recognized. Furthermore, many parts in the coffee can are used parts and the mechanic is reluctant or unable to charge for such parts even if he should happen to know a reasonable price to charge.

While it is possible, particularly for a large establishment, to buy conventional cabinets and keep its inventory of small parts in the drawers thereof, there are distinct disadvantages to this. First of all, the cabinets are expensive, a factor which places them out of reach of a small establishment. Moreover, to reach some compromise on expense, drawers are usually made large and compartmented. The result is that a complicated, hard to read label must be placed on the drawer in order to identify the contents thereof. It also means that in the case where the establishment employs mechanics to use the parts, if a mechanic needs a number of parts of a specific size, he must either find something to hold the parts in and remove as many as he needs from the drawer, or take the entire drawer with him to his working station. Conventional cabinet drawers are not intended for such use and moreover such use makes the remaining varieties of parts in the other compartments of the drawer unavailable to the other mechanics in the shop.

A further disadvantage of present practice is the fact that there is no up-to-date method of maintaining an adequate inventory. There is no escape for counting the parts in the drawers at regular intervals or, as an alternative, expecting everyone who uses a part to mark an inventory sheet at an appropriate place. Usually it is difficult to locate the correct place on the sheet and particularly troublesome when many sizes of the type of part are stocked and the user is in a hurry.

It is therefore a general object of this invention to provide an improved parts merchandising and storage device.

It is a further object of the present invention to provide a parts storage and merchandising device which is quite inexpensive It is a further object of the present invention to provide a device wherein an adequate inventory can be easily maintained.

It is a further object of the present invention to provide a device which expedites the location and utilization of small parts by a mechanic.

It is a still further object of the present invention to provide a device which facilitates the application of an appropriate charge for parts used.

It is a still further object of the present invention to provide a device which eliminates any necessity for relabeling of storage compartments or drawers.

Described briefly, a typical embodiment of the present invention provides a cabinet having a plurality of horizontal shelves and a plurality of drawers fitting neatly between the shelves. The drawers of the cabinet each have identifying means thereon at one end wall thereof, whereby the contents of the drawer can be immediately recognized from a mere glance at the front end wall of the drawer. Each drawer has means on its opposite end walls which identify and distinguish the walls, so that a drawer which is in place with its rear end wall at the front of the cabinet, can be readily and immediately recognized, even from a distance. The drawers themselves may be the nested combination of a box and inverted cover.

The full nature of the invention will be understood from the accompanying drawings and the following description and claims:

Figure 1:
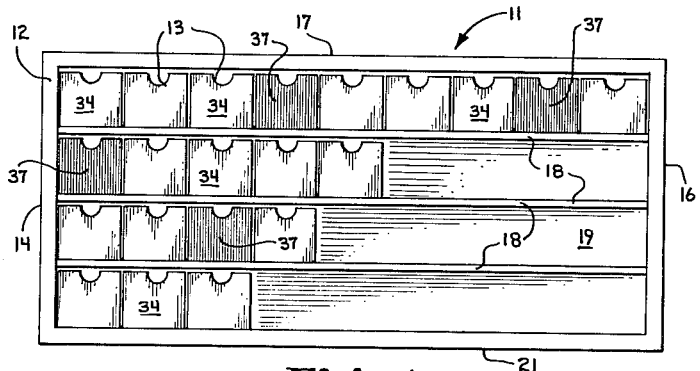
FIG. 1 is a front elevational view of a typical embodiment of the present invention.
Figure 2:
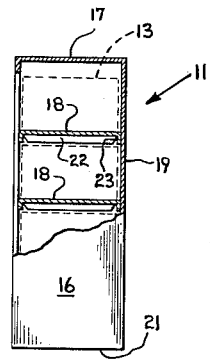
FIG. 2 is a side elevation partially in section, of the typical embodiment.

Referring to the drawing, the cabinet 11 includes the shell 12 which is usually made of sheet metal, and the drawers 13 which are usually made of paperboard. The cabinet shell includes the upstanding sidewalls 14 and 16 which are laterally spaced and which have the horizontal supports or shelves 18 extending therebetween. The cabinet shell top 17, back wall 19, bottom 21 and sidewalls 14 and 16 may be formed from a single piece of sheet steel, if desired. Normally the shelves 18 may be provided with suitable flanges 22 and 23 spot welded to adjoining wall surfaces.

Figure 3:
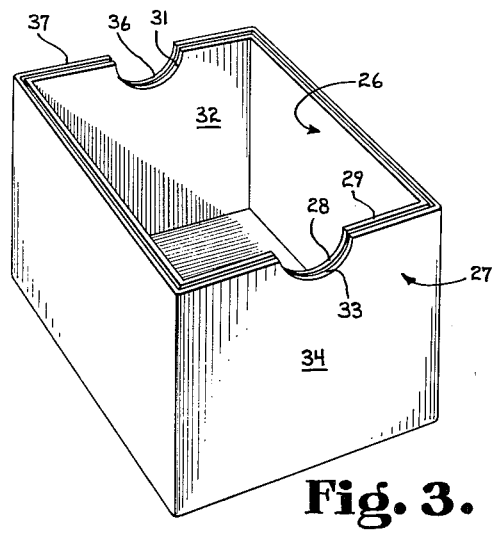
FIG. 3 is a perspective view of the drawer of the typical embodiment.

The drawers 13 each have an inner unit 26 and an outer unit 27. The inner unit is usually identical to the outer unit but slightly smaller whereby it can be nested within the outer unit as shown in FIG. 3. Likewise, the inner unit can be removed from the outer unit, and the outer unit inverted and installed vertically downwardly over the inner unit 26 to provide a cover for the inner unit.

Referring further to FIG. 3, the inner unit 26 is provided with a thumb notch 28 in the upstanding front end wall 29, and with a thumb notch 31 in the upstanding rear end wall 32. Likewise, the outer unit is provided with a thumb notch 33 in the upstanding rear end wall 37. The thumb notches thus provided accommodate easy removal of the drawers from the shelves, it being understood that the vertical dimensions of the upstanding walls are usually such as to provide a close fit between the shelves and the drawers, thereby excluding dust and dirt.

Figure 4:
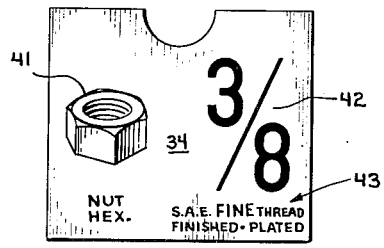
FIG. 4 is a front elevation of the drawer illustrating the parts identifying material displayed on the front end wall.

Referring to FIG. 4, the front upstanding end wall 34 of the drawer outer unit is shown to display the picture 41 of a nut, to represent the part which would be contained in this particular drawer, and at 42 a ⅜ dimension designating the size of the nut. Additional data to indicate the shape of the head, the thread type, and the plating of the part is included under the large picture and size description, and is designated generally by the reference numeral 43. This information may all be understood to be on a comparatively light colored or white background, for example.

Figure 5:
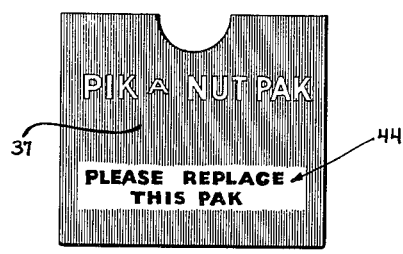
FIG. 5 is a rear elevation of the drawer of FIG. 4.

Referring to FIG. 5, in addition to an appropriate label, if desired, the rear end 37 is provided with material requesting that the drawer be replaced. This request is designated generally by reference numeral 44 and may be considered to appear in a light color on a vivid color of background or a color of background which at least contrasts with the color of the background of the front upstanding wall of the drawer. If white is the background color of the front end, red is a good color for the rear end. It will be recognized, therefore, that when the number of parts in a drawer diminishes to a point where a new supply should be provided, the drawer may be simply removed from its shelf and replaced in its same position with the rear end displayed. Thus, the jobber salesman servicing the establishment having the cabinet of the present invention can, at a glance, determine whether or not the inventory needs replenishment. He need only step inside the door of the establishment to make the observation, thus saving him time and saving time for the proprietor of the establishment. Also, the mechanic is saved the time and trouble of either marking an inventory sheet or the necessity of taking of a regular inventory.

It will be observed that by the nature of the drawers, the outer unit 27 may be removed from the inner unit 26, inverted, and installed over the inner unit 26. It is in this relative position, that replacement drawers are provided by the jobber salesman and the mere removal of the outer unit or box lid and inversion and insertion of the inner unit thereinto, readies the new drawer of parts for incorporation into the device.

Figure 7:
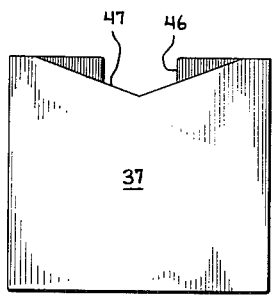
FIG. 7 is a rear elevation of the drawer of FIG. 6 showing a variation of the thumb notch in the rear end wall of the drawer.
Figure 6:
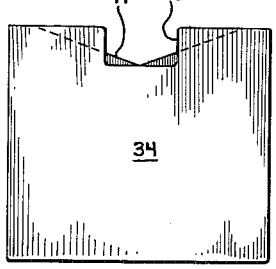
FIG. 6 is a front elevation of a drawer showing a variation of configuration of the thumb notch in the front end wall.

Referring to FIG. 6, a variation of configuration of the thumb notch in the front end wall of the drawer is illustrated. In this example, thumb notch 46 is generally rectangular in form. In FIG. 7, it is observed that the thumb notch in the rear end wall of the drawer of FIG. 6 is generally triangular in form. This thumb notch is designated by reference numeral 47. In this manner also, means are provided whereby the front end and rear end of the drawer can be readily recognized at a distance by a jobber salesman. In the drawing, of course, a portion of the opposite end wall can be seen through the notch in the front end wall. However, when the drawer is installed in the shell, the configuration of the end wall to the back will not be apparent inasmuch as most light will be excluded therefrom by virtue of the covering provided by the shelf immediately above the drawer or the top of the shell if the drawer happens to be in the top row.

It will be recognized from the foregoing that the present invention provides not only a unique but tremendously advantageous means of merchandising. Normally, all boxes to become drawers in the cabinet are of the same size. All are furnished at the same price, the number of parts therein being adjusted to provide equivalance of price. The cabinet shell is quite inexpensive inasmuch as no drawer rails are required.

No relabeling is necessary, a tremendous advantage over conventional parts stocking systems. The drawers fit snugly in the shelves and keep out dust and other forms of dirt. The drawers will come all the way out and the parts can be all dumped out by the mechanic if he desires. At the same time inasmuch as the drawers are not compartmented and do not contain other types of parts, only one part is dumped out when the drawer is upset.

The present invention, by virtue of the inexpensive nature of the construction, makes it feasible not only for business establishments to stock nuts and bolts and other parts, but makes the device readily suited for addition to the line of merchandise of grocery stores, drug stores and the like, as well as for home use. As an example of the dollar savings of storage space provided by the present invention, the same amount of storage space can be provided for a cost of one-fifth as much as conventional systems.

The marking of the identifying end of the box with the price of the part makes it possible for a mechanic to charge reasonable and realistic prices to the customer.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A parts storage and merchandising device comprising:
 a pair of laterally spaced upstanding walls,
 a plurality of supports extending horizontally between said walls,
 said supports being disposed in vertically spaced relation,
 an elongated parts container supported by one of said supports,
 said container having an inner unit with front and rear upstanding walls and a bottom extending between said walls,
 and said container having an outer unit with front and rear upstanding walls and a bottom extending between said walls,
 said inner unit being nested within said outer unit,
 said upstanding walls of one of said units being of a vertical dimension substantially equal to the vertical spacing between said supports whereby said container is substantially closed by one of said supports,
 said front and rear upstanding walls of said one of said units having notches in the upper margins thereof to facilitate removal of said unit from position between said supports,
 said notch in said front upstanding wall having a configuration different from the configuration of said notch in said rear upstanding wall whereby said front and rear upstanding walls of said one unit are identified.

2. A parts storage and merchandising device comprising:
 a pair of laterally spaced upstanding walls,
 a plurality of supports extending horizontally between said walls, said supports being disposed in vertically spaced relation, an elongated parts container supported by one of said supports, said container having front and rear upstanding walls and a bottom extending between said walls, said container having notches in the upper margin of the front and rear upstanding walls, said notch in the front upstanding wall having a configuration different from the configuration of said notch in said rear upstanding wall whereby said walls are identified.

References Cited by the Examiner

UNITED STATES PATENTS

| | | | |
|---|---|---|---|
| 1,102,886 | 7/1914 | Drake | 312—234 X |
| 2,480,416 | 8/1949 | Modes | 206—62 |
| 2,580,141 | 12/1951 | Vidal | 206—62 X |
| 2,842,420 | 7/1958 | Hansen et al. | 312—320 |
| 2,964,371 | 12/1960 | Todd | 312—234.5 |
| 2,998,128 | 8/1961 | Larson | 312—234.5 X |

FRANK B. SHERRY, *Primary Examiner.*

CHANCELLOR E. HARRIS, *Examiner.*